Aug. 22, 1961     S. APPLEBAUM     2,997,650
SPECTRUM ANALYZER
Filed Jan. 30, 1958     2 Sheets-Sheet 1
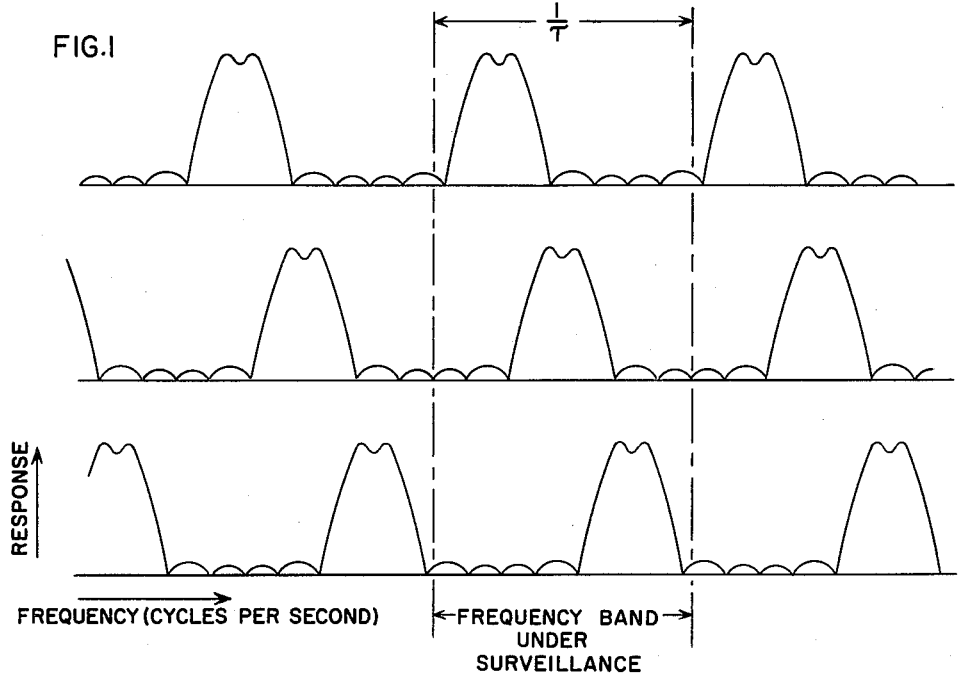
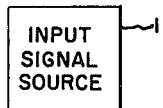
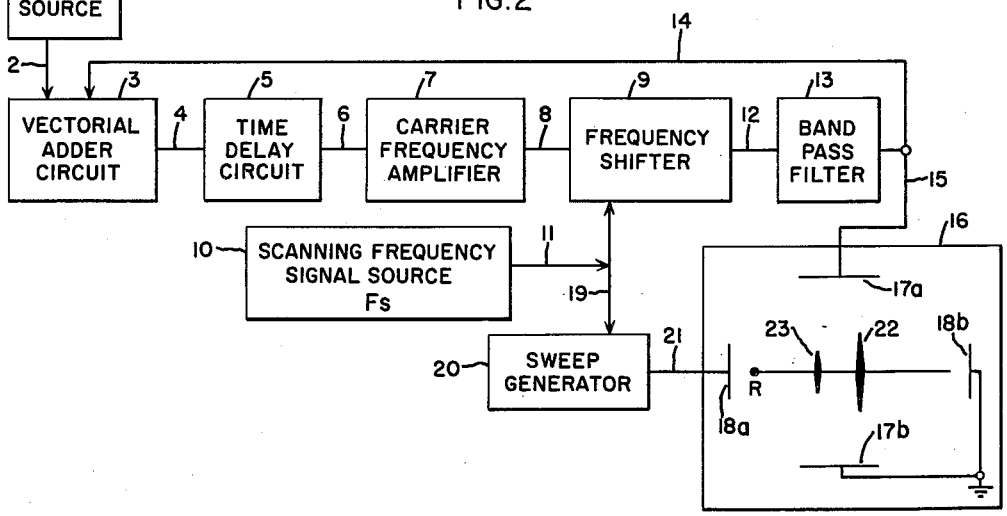
INVENTOR:
SIDNEY APPLEBAUM,
BY Michael Masnik
HIS ATTORNEY.

Aug. 22, 1961  S. APPLEBAUM  2,997,650
SPECTRUM ANALYZER
Filed Jan. 30, 1958  2 Sheets-Sheet 2
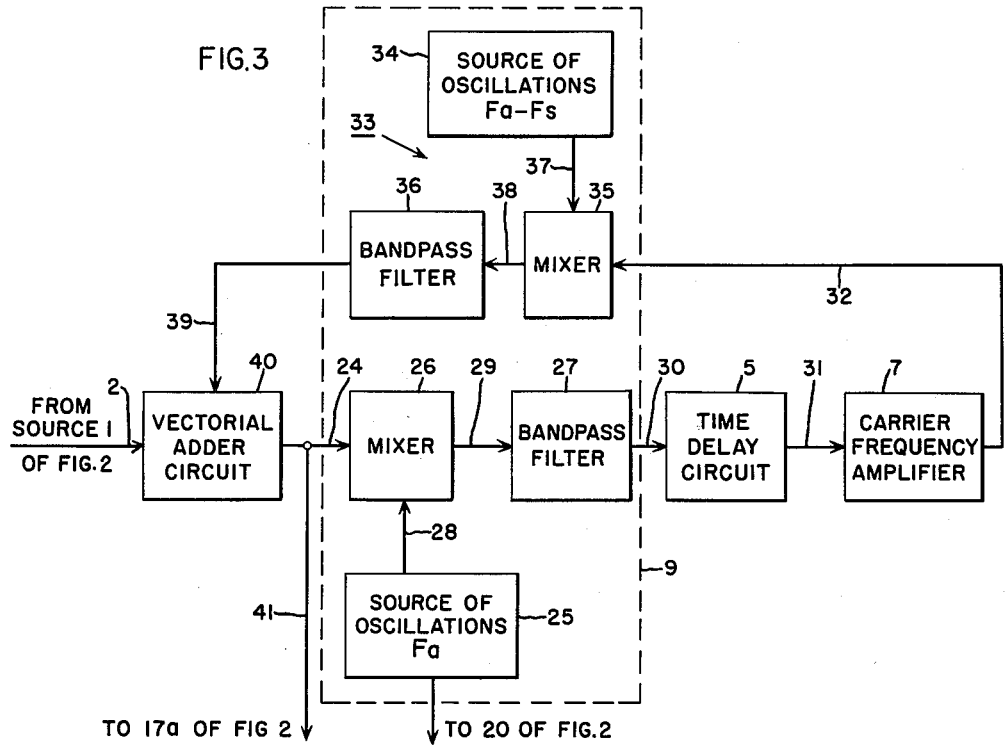
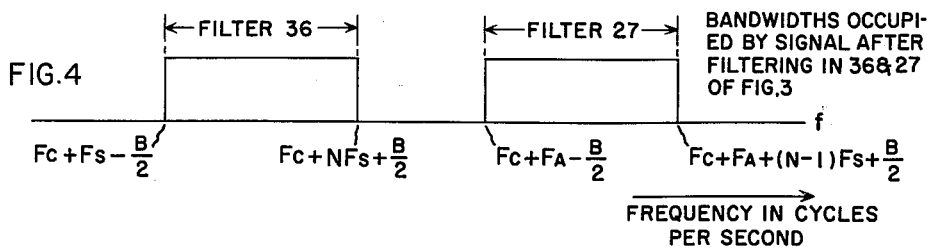
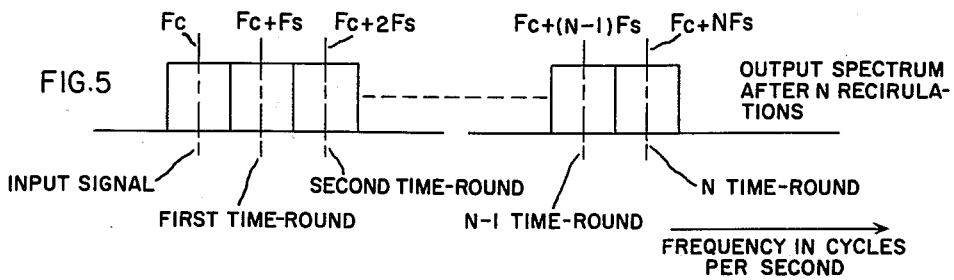
INVENTOR:
SIDNEY APPLEBAUM,
BY Michael Masnik
HIS ATTORNEY United States Patent Office 2,997,650
Patented Aug. 22, 1961

2,997,650
SPECTRUM ANALYZER
Sidney Applebaum, Liverpool, N.Y., assignor to General
Electric Company, a corporation of New York
Filed Jan. 30, 1958, Ser. No. 712,282
14 Claims. (Cl. 324—77)

This invention relates to methods and arrangements for scanning a band of signal frequencies to determine the frequency spectrum of any signal appearing in the band of frequencies being scanned.

It is oftentimes desirable in the electrical art to identify the existence of signals having particular characteristics. For example, it is sometimes desired to detect the existence of a signal of a given frequency in a background of noise or undesired signals.

In the previous application entitled "Frequency Scanning Filter Arrangement" Serial No. 708,733, filed on January 13, 1958, in the name of Sidney Applebaum and assigned to the same assignee, a spectrum analyzer in the form of a frequency scanning filter arrangement was disclosed employing a multitap time delay circuit. Sequentially, the input signal was successively time delayed by equal increments of time delay in the multitap delay line and angle modulated by equal increments of angle before being vectorially added to provide an output signal. The resulting output signal was equivalent to having passed the input signal through a linearly frequency scanning filter.

Under certain circumstances requiring long time delays it may be difficult to realize a multitap delay line within given physical dimensions.

It is therefore an object of my invention to provide an improved frequency scanning method and arrangement.

It is another object of my invention to provide an improved signal processing arrangement and method.

It is a further object of my invention to provide a scanning filter arrangement employing a single time delay circuit through which an input signal whose modulation characteristics are to be identified is recirculated.

It is a further object of my invention to provide an improved arrangement for detecting the existence of signals and/or identifying their frequency.

Briefly, in accordance with one embodiment of my invention, a frequency scanning filter function is provided by recirculating an input signal through a closed loop circuit comprising an adder circuit, a time delay circuit and a frequency shifting circuit. The time delay circuit delays an applied signal by a fixed amount each time it circulates through the loop. The frequency shifting circuit shifts the frequency of an applied signal by a fixed amount each time it circulates through the loop. The adder circuit vectorially continuously adds the input signal to the input signal already circulating in the loop. The vectorially added signals are equivalent to having passed the input signal through a frequency scanning, or swept comb filter.

For a better understanding of my invention reference is made to the following description taken in connection with the accompanying drawings and the appended claims wherein FIG. 1 illustrates graphically a frequency scanning filter characteristic, FIG. 2 illustrates in block diagram form one form of recirculating delay line scanner, FIG. 3 illustrates in block diagram forms a further embodiment of a recirculating delay line scanner, and FIGS. 4 and 5 are graphical representations useful in explaining the operation of the embodiments of the inventions illustrated in FIG. 3.

Before describing the invention, it should be noted that a frequency scanning action is achieved by the invention described in the aforesaid application by summing a weighted sequence of succesively time delayed and frequency shifted versions of the input signal.

For example, let us consider an input signal comprising a carrier frequency component with phase and/or amplitude modulation. If the input signal is successively delayed in time by $kT$ seconds and shifted up in frequency $kF_s$ cycles per second, where $k$ is any integer 0, 1, 2, 3 . . . N, weighted (by an adjustment in phase and/or amplitude) by a complex weight $a_k$, and then the $N+1$ components of the resulting signal vectorially added, it can be shown that the added output appears as an effectively filtered input signal on a carrier frequency which is $$\frac{N}{2}F_s$$

cycles per second greater than the input signal carrier frequency. The filter action or function performed on the input signal is periodic in the frequency domain with period $1/T$ and moves linearly with time along the frequency axis. This effective filter is time varying but linear, that is, the superposition principle applies. Thus, if two input signals are processed simultaneously, the resultant output is the sum of the outputs which would have been obtained if the input signals had been processed individually. In $1/F_s$ seconds, the filter function translates one period. FIG. 1 illustrates such a filter function at three successive time intervals. In order to scan a band of frequencies B cycles wide unambiguously, it is necessary to make $BT \leq 1$. The shape of the filter function depends on $N+1$, the number of signal components in the output, and on the weighting coefficients $a_k$. As has been explained in the aforementioned application, when all the weighting coefficients are chosen to be unity, a comb filter characteristic with the form $$\frac{\sin[\pi(N+1)X]}{\sin(\pi X)}$$

results. A uniform weighting exists if when a constant frequency signal is subjected to the time delay, frequency shifting and addition process previously mentioned, the amplitudes of the plurality of time delayed and frequency shifted signals applied to the adder circuit are equal and the phases are such that a maximum peak output is received upon addition in the adder circuit. This means that periodically a plurality of signals applied to the adder add algebraically to have an amplitude of $N+1$ times the amplitude of the signal available on any one of the input leads to the adder.

If the weighting coefficients are chosen to be unity and a continuous sine wave input signal is processed as aforementioned by time delaying, frequency shifting and vectorial addition, the envelope of the output will be a $$\left|\frac{\sin[\pi(N+1)X]}{\sin(\pi X)}\right|$$

time function. The peaks of the output signal will be $N+1$ times as large as the input signal and will occur $F_s$ times per second. The time position of these peaks on a time base synchronized to the $F_s$ frequency source will vary linearly with the frequency of the input sine wave. Thus, the frequency of the input signal is detected as a time position of the output signal. In general, the amplitude of the output signal gives the spectrum of the input signal as it would be obtained by scanning the outputs of an infinite bank of narrow overlapping filters, each having the $$\frac{\sin \pi(N+1)X}{\sin(\pi X)}$$

shape.

Referring to FIG. 2 there is shown one embodiment of the recirculating scanning filter. This arrangement provides a frequency scanning filter action equivalent to that disclosed in the aforementioned application with certain advantages, such as involving shorter time delays, etc. The input signal to be analyzed is applied from a source 1 over lead 2 to the vectorial adder circuit 3 to be added with other signals which will be described shortly. The output of the adder circuit 3 available on lead 4 is applied to a time delay circuit 5. Circuit 5, which may comprise a delay line, such as a quartz line or one made of lumped circuit elements, etc., is adapted to respond to a signal applied to lead 4 to produce said signal at an output lead 6 with a given time delay of T seconds. The time delayed signals available on lead 6 are amplified in the carrier frequency amplifier 7 to a suitable level before being applied over lead 8 to a frequency shifting circuit 9. Frequency shifter 9 operates under control of scanning oscillations of frequency $F_s$ available from source 10 over lead 11 to shift or change the frequency of the signals available on lead 8 by a fixed amount $F_s$ and to provide these signals with a changed frequency on output lead 12. The time delayed, frequency shifted signals available on lead 12 are applied to the bandpass filter 13. The functioning of the bandpass filter 13 will be described shortly. The output of the filter 13 is applied over lead 14 to the vectorial adder circuit 3 to be combined vectorialy with the input signal being applied over lead 2. The added signals are then applied through the time delay circuit 5, amplifier 7, shifted in frequency by circuit 9, passed through the filter 13 and applied to adder circuit 3 over lead 14 for addition with the input signal available from source 1. Thus it is seen that the arrangement thus far described constitutes a closed or recirculating loop performing a time delay and frequency shift function. After the input signal has been recirculated through the closed loop circuit comprising elements 3, 5, 7, 9 and 13 a plurality of times, the bandpass filter 13 operates to effectively block further recirculation of this signal through the loop. Thus the pass characteristic of the bandpass filter 13 is dimensioned such that it permits only the desired number of recirculations or integrations performed by the loop. It should be noted that a portion of the output signal available from filter 13 is available on lead 15.

The recirculating scanning filter described consists essentially of a closed signal processing loop. The input signal is injected into the loop by means of an adder 3. Each time the signal circulates around the loop, it is delayed in time in circuit 5, and its spectrum is shifted in frequency by circuit 9. The loop frequency gain characteristic determines the number of circulations and the weighting of the component signals in the output. Five main functions are performed in the loop: addition, time delay, amplification, frequency shifting and filtering. The input signal is fed in via the adder circuit 3, but the accumulated signal can be taken from any point in the loop, such as at lead 15. The other four functions may be distributed in any manner around the loop. For example, whereas the incremental signal delay has been shown as being supplied entirely by circuit 5, it is obvious that this delay may be distributed over the loop. To secure an ideal frequency scanning filter action, the phase of the oscillations $F_s$ is periodically reestablished at a given fixed value once every loop time delay period. One way to accomplish this is to dimension $F_s$ such that the product of $2\pi F_s$ and the loop delay is an integral multiple of $2\pi$. Departures from this operate to impair the resolution of the effective scanning filter response characteristic. The output signal available on lead 15 is effectively the input signal available from source 1 modified by having been passed through a scanning comb filter and being shifted in frequency by a frequency $$\frac{N}{2}F_s$$

As previously mentioned, when all the weighting coefficients are chosen to be unity, the filter function becomes a $$\left|\frac{\sin \pi(N+1)X}{\sin \pi X}\right|$$

time function. If the envelope of the signal available on lead 15 is displayed on a cathode ray oscilloscope whose sweep frequency is synchronized to the frequency $F_s$, the resultant display will be the aforementioned filter function centered on a position corresponding to the frequency of the input signal. If the frequency of the input signal is changed, the filter function would shift to a new position corresponding to the new input signal frequency. Schematically this has been shown in FIG. 2 wherein the cathode oscilloscope 16 comprises vertical electrostatic deflection elements 17a and 17b and horizontal deflection elements 18a and 18b. The output signal available on lead 15 is applied to the vertical deflection elements. A portion of the scanning signal oscillations available from a source 10, which may comprise a stable source such as a crystal controlled oscillator, are applied over lead 19 to a sweep generator 20 which generates a periodic sweep signal, such as a sawtooth wave, synchronized with the frequency $F_s$ of the oscillations from source 10. The output sweep signal of sweep generator 20, occurring at a rate corresponding to frequency $F_s$, is applied to the horizontal deflection elements 18a and 18b over lead 21. The resultant trace developed on the face of the cathode ray oscilloscope 16 is shown to comprise an indication such as 22. The amplitude of the indications 22 is proportional to the amplitude of the input signal and the horizontal displacement of the indication 22 from a reference frequency point R identifies the frequency of the input signal. If the input signal also contains a component of different frequency and a different amplitude, the indication would be such as that shown at 23. A comparison of the two indications 22 and 23 would show which of the two input signal components have the larger amplitude and their relative displacement would indicate their relative difference in frequency. Thus, by the aforementioned arrangement, applicant has succeeded in displaying the input signal on a time position scale such that its frequency components may be readily identified.

FIG. 3 illustrates an arrangement for frequency shifting which involves the use of two mixers and pass band filters. Wherever possible, common reference numerals have been retained in FIG. 3 to correspond with those employed in FIG. 2. The input signals available from source 1 are applied through the vectorial adder circuit 40 and over lead 24 to frequency shifter 9 where they are shifted up in frequency by $F_a$ cycles per second. Shifter 9 comprises a source of oscillations 25 of frequency $F_a$, such as a crystal controlled oscillator, a mixer circuit 26 and a filter circuit 27. The frequency shift is accomplished by mixing the signals available on lead 24 with the oscillations available on lead 28 from source 25 and applying the products over lead 29 to filter 27. Filter 27 is a bandpass filter and effectively passes only the upper side band of the mixed output available on lead 29. The output of filter 27 is applied over lead 30 to delay circuit 5 where it is delayed by fixed time T. The frequency shifted, delayed signals available on lead 31 are then amplified in carrier frequency amplifier 7 before application over lead 32 to a second component 33 of the frequency shifter 9. Component 33 comprises a source 34 of stable oscillations of frequency $F_a - F_s$, a mixer circuit 35 and a bandpass filter circuit 36. The signals available on lead 32 are mixed with the oscillations available on lead 37 from source 34 and the mixed output applied over lead 38 to filter 36. Filter 36 is a bandpass filter and passes only the lower sideband of the mixed output which is the input signal available on lead 24, time delayed and shifted by a frequency of $F_s$ cycles per second. The output of filter 36 is then applied over lead 39 to adder circuit 40 where it is vectorially added to the input signal available over lead 2 from source 1 before reapplication through the frequency shifting and delay line circuits previously described. In effect then the adder circuit output, in passing through the recirculating loop, is first shifted up in frequency by $F_a$ cycles per second, then delayed by delay line 3 and then the resulting signal spectrum is shifted down in frequency by $F_a - F_s$ cycles per second to provide an output signal corresponding to the input signal shifted in frequency by equal increments of frequency $F_s$ during successive recirculations through the loop. In the particular arrangement shown, the output of the scanner is taken from the recirculating loop at point 40 and applied over lead 41 to a desired output stage.

Let us assume that the input signal is located in a frequency band of width B centered about the frequency $F_c$. Each time the signal circulates around the loop, it is delayed T seconds and its spectrum is shifted up arithmetically by the amount $F_s$. After N times through the delay line, the shifted signal will be rejected by filters 27 and 36. The spectrum space occupied by the signals after the filters 27 and 36 are shown in FIG. 4. The nature of the output spectrum is shown in FIG. 5.

The frequency $F_a$ should be chosen judiciously to facilitate the separation of upper and lower side bands by filters 27 and 36 and to fit the operating requirements of the time delay circuit 5. Obviously, other combinations of shifting up or down in frequency, and selection of sidebands, may be employed to secure the desired incremental frequency shift $F_s$. Also, instead of shifting up in frequency by incremental steps, the shifting may be downward.

While the invention has been described in terms of processing signals with carrier frequency components, the invention permits spectrum analysis of other types of signals, such as video signals. The video may be scanned directly or may be first modulated onto a carrier frequency oscillation.

It should be noted that the type of resolution or filtering response characteristic obtained with this system depends upon the loop gain and the loop frequency response. If the loop gain is unity over its operating bandwidth, the resolution curve will have a $$\frac{\sin \pi(N+1)X}{\sin \pi X}$$

shape. By varying the loop gain, as for example by varying the gain of amplifier 7 of FIGS. 2 or 3, and/or the loop frequency response, by adjusting the bandpass characteristics of filters 13 of FIG. 2 and 27 and 36 of FIG. 3, the amplitude and phase of the resolution or filtering response characteristic may be modified to satisfy particular needs. A change in loop gain or loop frequency response is equivalent in effect to a change in the weighting $a_k$ previously discussed.

The scanning filter may also be used to detect in noise, signals with known modulation but unknown carrier frequency. To do this the weighting coefficients $a_k$ are chosen such that the filtering response characteristic is the complex conjugate of the spectrum of the signal modulation. It can be shown that this gives the best possible detection performance.

The present invention has application to many types of input wave forms in addition to that previously considered in explaining the operation of FIGS. 2 and 3. An example is an input signal comprising a train of periodic pulses with a repetition period of T seconds, where the carrier frequency components of the individual pulses are phase coherent, i.e., appear as pulse amplitude modulations of a continuous carrier frequency oscillation. Such a signal may be processed in the arrangement of FIGS. 2 and 3 to perform, in effect, a coherent integration on $N+1$ successive pulses where the timing of the resultant integrated output signal is indicative of the frequency of the carrier oscillations and may be displayed on an indicator such as 16 of FIG. 2. To perform such an integration, the time delay T of the time delay circuit 5 is dimensioned to be equal to T, the pulse repetition period, to insure that the $N+1$ pulses to be summed occur simultaneously on output leads 15 or 41 of FIGS. 2 and 3. The frequency shift or scanning frequency $F_s$ should be made greater than the pulse train bandwidth, if a complete frequency scan is desired during each pulse period.

While a specific embodiment has been shown and described, it will of course be understood that various modifications may yet be devised by those skilled in the art which will embody the principles of the invention and found in the true spirit and scope thereof.

What I claim and desire to secure by Letters Patent of the United States is:

1. In combination, a closed loop signal recirculating circuit responsive to an input signal for providing a signal circulating in said circuit, said circuit comprising means for vectorially adding said input signal to the signal already circulating in said circuit to provide said circulating signal, said circuit comprising means for shifting the frequency of said circulating signal each time said circulating signal circulates through said loop circuit and means for time delaying said circulating signal each time said circulating signal circulates through said circuit, and means blocking further circulating of a circulating signal component in said circuit when said component has been circulated through said circuit a plurality of times.

2. In combination, a signal recirculating circuit responsive to an input signal for providing a signal circulating in said circuit, means for vectorially adding said input signal to the signal already circulating in said circuit to provide said circulating signal, said circuit comprising means for shifting each of the frequencies of said circulating signal by the same fixed amount each time said circulating signal circulates through said circuit and means for time delaying said circulating signal by a fixed amount each time said circulating signal circulates through said circuit, means blocking further circulating of a circulating signal component in said circuit when said component has been circulated through said circuit a plurality of times, and means for utilizing said circulating signal.

3. An arrangement for deriving an output signal equivalent to having passed an input signal through a linear filter which has linearly frequency scanned a band of frequencies occupied by said input signal comprising a closed loop circuit responsive to said input signal for providing a signal circulating in said closed loop circuit, said closed loop circuit including means for vectorially adding said input signal to the signal already circulating in said loop to provide said circulating signal, said loop circuit comprising means for shifting each of the frequencies of said circulating signal by the same fixed amount each time said circulating signal circulates through said loop circuit and means for time delaying said circulating signal by a fixed amount each time said circulating signal circulates through said loop circuit, means blocking further circulating of a circulating signal component in said loop circuit when said component has been shifted to a predetermined frequency, and means for extracting said circulating signal from said loop circuit to provide said output signal.

4. An arrangement for analyzing an input signal occurring within a band of frequencies comprising a closed loop circuit responsive to said input signal for providing a signal circulating in said closed loop circuit, said closed loop circuit including means for vectorially adding said input signal to the signal already circulating in said loop to provide said circulating signal, a first and second source of oscillations of respective frequencies, said loop circuit comprising means responsive to said first and second source oscillations for shifting each of the frequencies of said circulating signal by said respective frequencies each time said circulating signal circulates through said loop circuit and means for time delaying said circulating signal by a fixed amount each time said circulating signal circulates through said loop circuit, means blocking further circulating of a circulating signal component in said loop circuit when such component has been shifted to a predetermined frequency, and means for comparing the timing of said circulating signal with the net frequency shift of said circulating signal each time it passes through said loop to provide an analysis of said input signal.

5. An arrangement for analyzing an input signal occurring within a band of frequencies comprising a closed loop circuit responsive to said input signal for providing a signal circulating in said closed loop circuit, said closed loop circuit including means for vectorially adding said input signal to the signal already circulating in said loop to provide said circulating signal, a source of scanning oscillations of given frequency, said loop circuit comprising means responsive to said scanning oscillations for shifting each of the frequencies of said circulating signal by said given frequency each time said circulating signal circulates through said loop circuit and means for time delaying said circulating signal by a fixed amount each time said circulating signal circulates through said loop circuit, means blocking further circulating of a circulating signal component in said loop circuit when such component has been shifted to a predetermined frequency, and means for comparing the timing of said circulating signal with the frequency of said scanning oscillations to provide an analysis of said input signal.

6. An arrangement for analyzing an input signal occurring within a band of frequencies comprising a closed loop circuit responsive to said input signal for providing a signal circulating in said closed loop circuit, said closed loop circuit including means for vectorially adding said input signal to the signal already circulating in said loop to provide said circulating signal, said loop circuit comprising means for shifting each of the frequencies of said circulating signal by the same fixed amount each time said circulating signal circulates through said loop circuit and means for time delaying said circulating signal by a fixed amount each time said circulating signal circulates through said loop circuit, means blocking further circulating of a circulating signal component in said loop circuit when such component has been circulated through said loop circuit a plurality of times, and means for comparing the timing of said circulating signal with the timing of said frequency shifting to provide an analysis of said input signal.

7. An arrangement for processing a train of periodic pulses having phase coherent carrier frequency components comprising a closed loop circuit responsive to said train of pulses for providing a signal circulating in said loop circuit, said closed loop circuit comprising means for vectorially adding pulses from said train of pulses to the signal already circulating in said loop circuit to provide said circulating signal, said loop circuit comprising means for changing each of the frequencies of said circulating signal by the same fixed amount each time said circulating signal circulates through said loop circuit and a time delay circuit for delaying said circulating signal by an amount equal to the period between successive pulses in said train each time said circulating signal circulates through said loop circuit, means blocking further circulating of a circulating signal component in said loop circuit when such component has been changed to a predetermined frequency, and means for utilizing said circulating signal.

8. An arrangement for processing a train of periodic signals having phase coherent carrier frequency components comprising a closed loop circuit responsive to said train of signals for providing a signal circulating in said loop circuit, said closed loop circuit comprising means for vectorially adding periodic signals from said train of signals to the signal already circulating in said loop circuit to provide said circulating signal, said loop circuit comprising means for changing each of the frequencies of said circulating signal by the same fixed amount each time said circulating signal circulates through said loop circuit and a time delay circuit for delaying said circulating signal by an amount integrally related to the period between successive periodic signals in said train each time said circulating signal circulates through said loop circuit, means blocking further circulating of a circulating signal component in said loop circuit when such component has circulated through said loop circuit a given plurality of times, and means for utilizing said circulating signal.

9. An arrangement for processing a train of periodic pulses having phase coherent carrier frequency components comprising a closed loop signal recirculating circuit responsive to said train of pulses for providing a signal circulating in said circuit, said circuit comprising means for vectorially adding periodic pulses from said train of pulses to the signal already circulating in said circuit to provide said circulating signal, said circuit comprising means for changing the frequency of said circulating signal each time said circulating signal circulates through said circuit and a time delay circuit for delaying said circulating signal by an amount integrally related to the period between successive periodic pulses in said train each time said circulating signal circulates through said circuit, means blocking further circulating of a circulating signal component in said loop circuit when such component has circulated through said circuit a given plurality of times, and means for utilizing said circulating signal.

10. An arrangement for processing a train of periodic pulses having phase coherent carrier frequency components comprising a closed loop circuit responsive to an applied signal for causing said applied signal to be circulated in said loop a given number of times and for continuously vectorially adding said applied signal to the applied signals already being circulated in said loop, said loop circuit comprising means for changing the frequency of said circulating pulses by the same fixed amount each time said circulating pulses circulate through the loop, and a time delay circuit for time delaying said recirculating pulse by an amount equal to the period of the pulses in said train of pulses each time said circulating pulses circulate through said loop, and means for utilizing said vectorially added pulses.

11. In combination, a source of an input signal, a closed loop signal recirculating circuit comprising a time delay circuit responsive to an applied signal to provide said signal with a fixed time delay, a frequency shifting circuit responsive to an applied signal to provide said signal with a fixed change in its frequency, and an adder circuit, said signal recirculating circuit responsive to an input signal applied to said adder circuit for providing a signal circulating in said loop a plurality of times, said signal recirculating circuit comprising means for vectorially adding said input signal to the signal circulating in said loop circuit to provide said circulating signal, and means for utilizing said circulating signal.

12. In combination, a source of an input signal, a closed loop circuit comprising an adder circuit, a time delay circuit and a frequency shifting circuit, said closed loop circuit responsive to an input signal applied to said adder circuit for causing a signal to be recirculated in said loop a given number of times, said time delay circuit time delaying said circulating signal by a fixed amount each time it circulates through said loop, said frequency shifting circuit shifting the frequency of said circulating signal a fixed amount each time it circulates through the loop, said adder circuit vectorially adding said input signal to the input signal already circulating in the loop each time it circulates through the loop to comprise said circulating signal, and means for utilizing said vectorially added signals.

13. In combination, a signal recirculating circuit responsive to an input signal for providing a signal circulating in said circuit, said circuit comprising means for shifting the frequency of said circulating signal each time said circulating signal circulates through said circuit and means for time delaying said circulating signal each time said circulating signal circulates through said circuit and means blocking further circulating of a circulating signal component in said circuit when said component has been circulated through said circuit a plurality of times.

14. In combination, a signal recirculating circuit, said circuit including a loop containing a time delay means, said circuit being responsive to an input signal comprising a single carrier pulse of a duration less than the said time delay of said loop for providing a signal circulating in said circuit, said circuit comprising means for shifting the frequency of said circulating signal each time said circulating signal circulates through said loop circuit and said time delay means for delaying said circulating signal each time said circulating signal circulates through said circuit, and means blocking further circulating of a circulating signal component in said circuit when said component has been circulated through said circuit a plurality of times.

References Cited in the file of this patent

UNITED STATES PATENTS

| | | |
|---|---|---|
| 2,711,516 | Fredendall | June 21, 1955 |
| 2,729,698 | Fredendall | Jan. 3, 1956 |
| 2,797,326 | Putzrath | June 25, 1957 |
| 2,800,580 | Davies | July 23, 1957 |